United States Patent Office 2,960,634
Patented Nov. 15, 1960

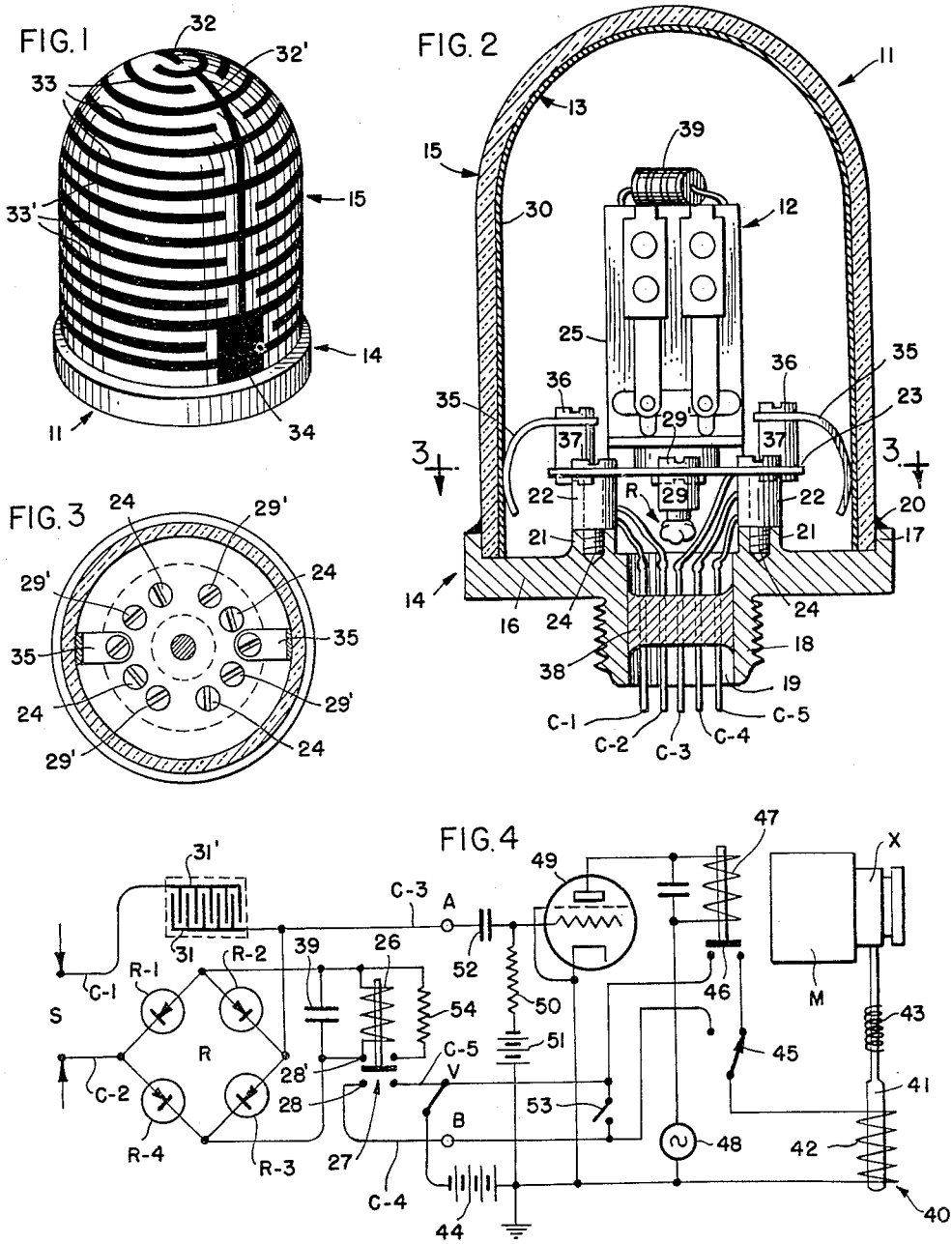

2,960,634

PHOTOSENSITIVE SYSTEM

John E. Jacobs, Hales Corners, Wis., assignor to General Electric Company, a corporation of New York Filed Mar. 31, 1955, Ser. No. 498,175

4 Claims. (Cl. 317—130)

The present invention relates in general to electronics and has more particular reference to photosensitive means for controlling the operation of an associated device, in response to change in the intensity of incident light, the invention pertaining more especially to equipment for actuating the photographic exposure shutter mechanism of cameras in response to the occurrence of a burst of illumination covering the picturing field of the camera.

Cameras are commonly employed for picturing purposes by orienting the same in position, in the substantial absence of picturing light rays, to picture a desired view field and by then illuminating the field during a desired picture interval, with picturing light rays, the camera shutter being opened either prior to or substantially at the start of the view illuminating interval and being closed as at or after the conclusion of said interval. Such procedure is frequently employed in the making of aerial photographs of land areas, at night, as from camera mounting aircraft, illumination of the view field to be pictured being obtained by means of suitable light emitting flares.

An important object of the present invention is to provide photosensitive control apparatus operable to actuate the shutter of an associated camera mechanism in response to variations in the intensity of incident light; a further object being to provide control apparatus of the character mentioned which will operate to close a previously opened camera shutter in response to the reduction in the intensity of picturing illumination below a selected mean value; a further object being to provide control apparatus operable to open a camera shutter substantially instantaneously in response to the increase in the intensity of incident illumination above a selected level.

Another important object is to provide photosensitive camera shutter control apparatus, including light sensitive detecting means and an associated operable device, such as an electrical relay, controllingly associated with the detecting means and adapted for operation in response to light intensity variations as measured by the detecting means, said relay being adapted for controlling association with driving means for actuating the shutter of the camera; a further object being to enclose the light sensitive detecting means, together with its associated relay, in a dirt and moisture proof housing, to thereby provide a convenient unit well adapted for use in position exposed to natural weather conditions, such as may be encountered during the making of aerial photographs at night.

Another important object is to provide light responsive control apparatus, including photosensitive detecting means and an electrical relay in controlled relationship with respect to said detecting means, the relay being controllingly associated with the exposure shutter of an associated camera mechanism, said relay being enclosed with said detecting means in a moisture and dirt excluding housing, having a portion formed of material which is substantially transparent to light rays to which the enclosed detecting means is sensitive, said means being mounted behind the ray transparent housing portion in position to be impinged by light rays delivered therethrough from outwardly of the housing.

Another important object is to provide camera shutter actuating apparatus of the sort mentioned wherein the photosensitive detecting means comprises a thin layer of ray responsive material coated upon the inner surface of the ray transparent portion of the relay enclosing housing; a further object being to form the ray transparent housing portion as a dome-like shell of ray transparent material, such shell being readily sealable in hermetic fashion upon a relay supporting base member to form therewith an enclosing housing for the relay and the detecting means; a still further object being to form the photosensitive detecting means upon the inner surface of the dome-like shell in position to receive the impingement of incident light rays with maximum efficiency.

Another important object is to provide a photosensitive camera shutter operating unit enclosed in a sealed housing having a ray transparent portion, as of glass, carrying a layer of ray sensitive material coated upon the inner surface of said transparent portion, and electrode means applied upon and in electrical contact with said layer, including a pair of spaced electrodes, each comprising spaced apart fingers in electrical contact with said layer throughout substantially the entire extent thereof, the fingers of one electrode being interspersed between the corresponding fingers of the other.

Another important object is to provide, in combination with a camera having an operable exposure shutter, a light responsive shutter actuating device of the character mentioned, comprising a relay switch and photosensitive light detecting means controllingly connected with said relay switch to cause the same to open and close in response to variations in the intensity of light rays impinging upon the detecting means, the switch and detecting means being enclosed in a moisture and dirt proof housing, to form a control unit adapted to be mounted in position exposed to skyshine, as on and outwardly of a camera carrying aircraft adapted for aerial photography, said unit including conductor means extending outwardly of the housing for controlling connection with a source of energizing power and with a camera shutter to be actuated under the control of said photosensitive light detecting means.

Another important object is to provide a relatively inexpensive photosensitive control device for operating camera shutters and embodying a crystalline light responsive detector, such as the sulphide of cadmium or mercury or the selenide of cadmium.

Briefly stated, in accordance with one aspect of the invention, the photosensitive camera shutter control apparatus may be constituted as an assembly unit comprising a support plate forming a base, a relay switch mounted on said base together with current rectifying means, a dome-like shell of ray pervious material, such as glass, having an open end sealingly secured to the periphery of the support plate to form therewith a moisture and dirt excluding housing enclosing the relay switch and rectifier means, the inner surface of the dome-like shell being coated with a layer of light sensitive material, such as the sulphide of cadmium or mercury or the selenide of cadmium, said layer being provided with spaced electrode means embodying interspersed fingers in electrical contact with said layer substantially throughout its entire area, the unit including circuit means within the housing for interconnecting the layer connected electrodes with the rectifier means and the relay switch, the support base being provided with sealed means for interconnecting the enclosed components of the unit with an electrical translation circuit, outwardly of the housing, and including an electron flow amplifier, such as a thyratron, for operating a camera shutter actuating relay switch in response to light intensity fluctuations as measured by the detecting means within said dome-like shell.

The foregoing and numerous other important objects, advantages and inherent functions of the invention will become apparent as the same is more fully understood from the following description, which, taken in connection with the accompanying drawings, discloses a preferred embodiment of the invention.

Referring to the drawings:

Fig. 1 is a perspective view illustrating a photosensitive unit which may be employed for the actuation of the exposure shutter of a camera in accordance with the present invention;

Fig. 2 is a sectional view taken substantially along the line 2—2 in Fig. 1;

Fig. 3 is a sectional view taken along the line 3—3 in Fig. 2; and

Fig. 4 is a circuit diagram of connections which may be applied in a camera shutter actuating system embodying the invention.

To illustrate the invention, the drawings show a photosensitive unit 11 for controlling the operation of the exposure shutter mechanism X of a camera M, said unit 11 comprising an electrical relay 12 and photosensitive detector means 13 controllingly connected with said relay to cause the same to operate in response to changes in the intensity of light incident upon the detecting means 13. The unit 11 is particularly well suited for use in position exposed to natural weather conditions, the unit being adapted for mounting as on and outwardly of camera carrying aircraft for controlling the operation of the exposure shutters of aircraft mounted cameras as used for aerial photography at night. To these ends, as shown more especially in the illustrated embodiment, the relay 12 and detecting means 13 may be enclosed within a sealed, moisture and dirt proof housing 14 embodying a portion 15 comprising material which is substantially transparent to light rays to which the detecting means is sensitive. The transparent housing portion 15 may comprise glass, so that visible light rays penetrating said portion may impinge upon the sensitive detecting means 13 and thus cause the same to control the operation of the relay 12 in response to changes in the intensity of light rays incident upon the detector means 13.

The housing 14 may conveniently comprise a plate-like support base 16, as of metal such as steel, the base being preferably formed with an upstanding peripheral flange 17 and a dependent, preferably cylindrical mounting collar 18, which may be externally screw threaded to facilitate attachment of the unit upon any suitable, convenient, or conventional support means correspondingly threaded to receive the collar. The collar 18 may be and preferably is disposed centrally of the support base 16 and formed integrally therewith, the collar defining an opening 19 through said support base. The ray transparent housing portion 15 may conveniently comprise a dome-like shell, which may have generally hemispherical configuration, or as shown, the shell may comprise a cylinder, closed at one end and open at the other, the open end of the shell being sized to fit snugly within the flanged rim 17 of the support base, whereby the shell may be sealingly secured to the base by any suitable sealing material applied to form a peripheral seal 20.

Inwardly of its marginal edge, the support base 16 may be provided with upwardly extending bosses 21 spaced about the opening 19 and adapted to carry insulators 22, on which, in turn, a support plate 23 may be mounted, said plate and the insulators 22 being secured on the bosses 21, as by means of studs 24 penetrating the mounting plate and insulators and having threaded engagement in the bosses.

The relay 12 may comprise a frame 25 forming a magnetic circuit, an actuating coil 26, a shiftable armature 27, and switch contact elements 28 operated by movement of the armature. The relay may be mounted on the support plate 23 in any suitable or preferred fashion, as by means of fastening screws applied to clampingly fasten the frame 25 on the plate 23. The plate 23 may also carry rectifier means R of any suitable or convenient type, said rectifier means preferably comprising a diode element or elements of semi-conducting material, such as germanium, silicon, or other semi-conductive substance capable of electrical current rectification. As shown, the rectifier means R may be mounted on insulating means 29, which, in turn, may be secured on the mounting plate 23, as by means of fastening screws 29'. As shown more particularly in Fig. 4 of the drawings, a plurality of rectifying elements R–1, R–2, R–3, and R–4 may be employed, said elements being preferably mounted in circularly spaced relation on the plate intermediate the plate supporting insulators 22.

The photosensitive detector means 13 may comprise crystalline light sensitive material, such as the sulphide of cadmium or mercury, or the selenide of cadmium, the same being disclosed in the co-pending application for U.S. Letters Patent Serial No. 228,333, of May 25, 1951, now abandoned, on the invention of John E. Jacobs in Semi-Conductor. These crystalline photosensitive materials may be comminuted to dust-like consistency, mixed with varnish or shellac as a carrier binder, applied as a thin layer upon the inner surface of the light transparent housing portion 15 and secured in situ by baking the applied layer, preferably in vacuo, to drive off the volatile components of the binder, as described more particularly in an application for U.S. Letters Patent Serial No. 270,235 of February 6, 1952, now abandoned, on the invention of John E. Jacobs in Semi-Conductive Layers and Method of Making Same.

Alternately, crystalline photosensitive material may be evaporated and caused to condense as a thin film upon the inner surfaces of the housing portion 15. To this end, where the transparent housing portion 15 comprises a dome-like shell, a quantity of photosensitive material may be placed in a shallow tray or boat within the shell and evaporated, as by inductively heating the material, within the shell, vacuum conditions being maintained within the shell in any suitable or preferred fashion, as by closing the open end thereof with a cover containing an exhaust connection and also forming a support for the material supporting boat and the inductive heating means. Crystalline material thus provided in vaporized condition within the shell may be caused to condense upon the inner surfaces thereof merely by maintaining the shell at a material condensing temperature, as by applying external currents of cooling fluid, such as air, thereto. Crystalline photosensitive material 13 may thus be applied as a layer 30 that is substantially translucent in situ upon the inner surface of the transparent envelope portion 15.

In order to provide for interconnecting the material of the layer 30 in controlling relationship with the relay 12, a pair of spaced apart electrodes 31 and 31' may be provided in electrical contact with the layer 30, said electrodes preferably comprising silver or other preferably metallic electrical conducting material, printed or otherwise applied upon the inwardly facing surface of the layer. As shown, the electrodes 31 and 31' comprise each a pair of stripes 32 and 32' extending radially and longitudinally of the shell, from its apex to the open end thereof, respectively, on diametrically opposite sides of the shell, and circumferentially extending fingers 33 and 33' connected, respectively, with said stripes and extending oppositely therefrom, the fingers 33 being substantially parallel and alternately interspersed with respect to the fingers 33', so that all portions of the stripe 32 and fingers 33, comprising one electrode, are substantially equally spaced with respect to the adjacent portions of the stripe 32' and fingers 33', which form the other electrode. The electrodes are each preferably provided with an enlarged conductive portion 34, said portions being preferably disposed on opposite sides of the shell 15 near the open end thereof in position to make electrical contact with cooperating wiper blades 35, secured, as by means of fastening screws 36, on insulating pedestals 37, carried by the support plate 23, means being provided for electrically connecting the wiper blades 35 and, hence, the photosensitive layer connected electrodes with the circuit components mounted on the plate 23.

It will be apparent, of course, that all of the components of the unit, other than the shell 15, the shell mounted layer 30 and the layer engaging electrodes, may be mounted and assembled on the support base 16 prior to the application of the shell 15 in housing forming position upon the base member 16.

The assembly unit may also include a plurality of conductors C-1, C-2, C-3, C-4, and C-5, extending in the channel 19 through the collar 18 and suitable channel sealing means 38 disposed in said collar, said sealing means conveniently comprising a body of plastic material having insulating properties applied in the collar 18, in position sealing the opening 19. The conductors C-1 and C-2 may be electrically interconnected with the photosensitive layer, the rectifying means and the relay coil 26, thereby providing for the connection of the control device with a suitable source of electrical power S for the operation of the device. The conductors C-3, C-4, and C-5 provide for controllingly connecting the unit with translation circuit means, including circuit components for actuating the camera shutter X. As shown, the conductor C-3 connects the power source remote side of the detector unit 13 with a connection terminal A, while the conductors C-4 and C-5 respectively connect the opposite sides of the relay switch 28 with connection terminals B and V.

After assembly of all unit components in position on the support base 16, it is merely necessary to apply the separately fabricated shell 15 in housing forming position on the support base, with the conductive portions 34 of the layer connected electrodes in electrical contact with the wiper contact blades 35, and to apply the peripheral seal 20 in order thus to complete the fabrication of the unit.

As shown, the rectifying elements R-1, R-2, R-3, and R-4 may be interconnected to form a rectifying system adapted to be connected with a source of alternating current power S, in series with the photosensitive detector means 13, through the power supply conductors C-1 and C-2, the operating coil 26 of the relay being connected across the output side of the rectification system, preferably in parallel with a condenser 39, said condenser being enclosed with the relay, within the housing 14. Accordingly, unidirectional current power may be supplied from the rectifying system, to energize the relay coil 26, in response to the delivery of alternating current power to the rectifying system, under the control of the light sensitive means 13. Alternately, the operating coil 26 of the relay may be interconnected between the power supply conductors C-1 and C-2, in series with a suitable rectifier and the photosensitive means 13. In such case, power to energize the relay coil 26 may be delivered from the alternating current power source S, through the rectifier, under the control of the light sensitive means 13.

In the absence of light, the photosensitive means 13 functions substantially as an insulator to prevent the flow of current therethrough. Accordingly, the rectifying means, in the absence of incident light on the layer 30, will pass no actuating energy to the relay coil, which will consequently remain de-energized. As the intensity of incident light on the photosensitive detector 13 increases from a condition of substantial darkness, the material of the layer 30 will become progressively more electrically conductive, thereby permitting the delivery of electrical energy in increasing amounts, through the rectifying means, to the operating coil of the relay. The relay 12, accordingly, will be caused to operate as soon as the intensity of light incident upon the photosensitive means 13 reaches a value permitting delivery to the coil 26 of sufficient energy to actuate the relay.

The camera shutter X, of course, may embody any suitable, preferred or conventional mechanism, the same being operable in response to actuation of a shiftable shutter tripping member. Conventional shutter mechanisms also may be selectively adjusted for automatic and non-automatic operation. When adjusted for automatic operation, actuation of the shutter tripping member results in the opening of the shutter and subsequent automatic reclosure thereof at the end of an exposure interval of duration determined by timing means forming a part of the shutter mechanism, said timing means being adjustable to determine the duration of the timed exposure interval. When adjusted for non-automatic operation, the shutter may be opened in response to actuation of the shutter tripping member, after which the shutter may be closed only in response to reactuation of the tripping member, after the elapse of an exposure interval of desired duration.

Any suitable or preferred translation means may be employed for actuating the camera shutter tripping mechanism under the control of the photosensitive detector means 13. As shown, the translation system may comprise a relay device 40 embodying an armature member 41 adapted to be drivingly associated with the shutter tripping member, and a solenoid coil 42 operable, when electrically energized, to shift the armature member, as against the influence of a spring 43, to thereby actuate the shutter tripping member.

Means may be provided for actuating the apparatus in a so-called "synchronous" mode, by energizing the coil 42, under the control of the sensitive detector means 13, in response to the application of light thereon, at device operating intensity. In such case, the adjustable timing means of the shutter mechanism may be employed to close the shutter, automatically, at the end of an exposure interval of desired duration, following the opening of the shutter. Means may also be provided for operating the apparatus in "non-synchronous" fashion, by causing the shutter to open, as by momentarily energizing the solenoid 42, prior to the incidence of device actuating light on the detector means 13. Thereafter, the shutter may be caused to close, after a time delay of desired duration, following application of device actuating light upon the detector means 13.

To accomplish the foregoing, the solenoid coil 42 may be connected, at one end, with the preferably grounded side of a source of solenoid operating power 44, the ground remote side of said source being connected to the terminal V of the unit 14. Means, such as a selector switch 45, may be provided for connecting the other end of the solenoid 42 with the ground remote side of the source 44, either through a normally open relay switch 46 directly to the source connected terminal V, or through the terminal B of the unit 14 and the normally open relay switch 28 to the source connected terminal V. The relay switch 46 may have an associated actuating coil 47 adapted, when energized, to close the switch 46. The actuating coil 47 may be connected in series with a source of coil energizing power 48 to form a coil energizing circuit extending between the anode and cathode of a gaseous conduction electron flow device, such as a thyratron valve 49, which thus is adapted to control the operation of the relay coil 47. The cathode of the thyratron valve and the side of the power source 48 connected therewith are preferably grounded. The control grid of the thyratron valve may be connected with the cathode of the valve, preferably through a resistor 50 and a source of grid biasing potential 51, the control grid of the valve being also connected through a condenser 52 with the terminal A of the unit 14 and thence with the photosensitive detector 13, through the conductor C-3.

In order to adjust the apparatus for operation in the "synchronous" mode, the selector switch 45 may be positioned to connect the solenoid 42 with the ground remote side of the source 44 through the switch 46, the camera shutter mechanism being also adjusted for automatic operation at a desired exposure interval setting. Thereafter, when a flash of picturing illumination occurs within the range of the apparatus, the detector means 13 will become conductive and pass potential to the control grid of the thyratron valve, thus rendering the same conductive to energize the relay coil 47, close the switch 46 and thereby, in turn, energize the coil 42 for the actuation of the shutter. Accordingly, the shutter will open in response to the occurrence of picturing illumination and will close automatically at the conclusion of a picturing interval of desired duration through the operation of timing means such as may be incorporated in the shutter mechanism of the camera.

In order to operate the apparatus in "non-synchronous" fashion, the selector switch 45 may be adjusted to connect the ground remote end of the coil 42 with the terminal B of the unit 14 and thence, through the switch 28, to the ground remote side of the power source 44, at the terminal V. The shutter X may also be adjusted for non-automatic operation. The shutter may then be opened in any suitable or convenient fashion, as by the momentary closure of a normally open switch 53 connected in parallel relation with respect to the relay switch 28 and hence adapted to energize the coil 42 from the source 44. The shutter should thus be opened prior to the occurrence of the burst of picturing illumination. Where used for aerial photography, at night, the shutter may be opened at the instant of release of a photo flash bomb from the camera carrying aircraft. To this end means may be provided for closing the switch 53 in unison with the actuation of the flash bomb release mechanism. Upon explosion of the flash bomb, the resultant application of light, upon the detector means 13, will render the same sufficiently conductive to cause closure of the relay switch 28, after a time delay of desired duration for picturing purposes. The duration of such time delay may be determined by the operating characteristics of the relay 27, which may include a normally closed switch element 28', in addition to the normally open switch 28, such normally closed switch 28' serving to connect a resistance 54 of selected value in parallel with the relay coil 26 to provide desired time delay operating characteristics.

It is thought that the invention and its numerous attendant advantages will be fully understood from the foregoing description, and it is obvious that numerous changes may be made in the form, construction, and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. Apparatus for selectively controlling the operation of a power actuated device comprising a photosensitive semi-conductor forming a light detector, a fast acting relay operable substantially instantaneously under the control of said detector in response to impingement thereon of light at intensities in excess of a selected triggering level, a time delay relay operable under the control of said detector at the end of a time delay interval of selected duration following application of light on said detector at intensities in excess of a selected triggering level, and means operable to connect said time delay and fast acting relays selectively in power supply controlling relation with respect to said power actuated device.

2. Apparatus for selectively controlling the operation of a power actuated device comprising a photosensitive semi-conductor forming a light detector, a thyratron relay operable under the control of said detector in response to impingement thereon of light at intensities in excess of a selected triggering level, a time delay relay operable under the control of said detector at the end of a time delay interval of selected duration following application of light on said detector at intensities in excess of a selected triggering level, and means operable to connect said time delay and thyratron relays selectively in power supply controlling relation with respect to said power actuated device.

3. Apparatus for selectively controlling the operation of a power actuated device comprising a photosensitive semi-conductor forming a light detector, a fast acting relay operable substantially instantaneously under the control of said detector in response to impingement thereon of light at intensities in excess of a selected triggering level, a time delay relay operable under the control of said detector at the end of a time delay interval of selected duration following application of light on said detector at intensities in excess of a selected triggering level, means operable to connect said time delay and fast acting relays selectively in power supply controlling relation with respect to said power actuated device, and a housing enclosing said time delay relay and having a light transparent wall portion, said semi-conductor being formed as a layer of material coated upon an inwardly facing surface of said wall portion, whereby said detector is enclosed in said housing with said time delay relay.

4. Apparatus for selectively controlling the operation of a power actuated device comprising a photosensitive semi-conductor forming a light detector, a thyratron relay operable under the control of said detector in response to impingement thereon of light at intensities in excess of a selected triggering level, a time delay relay operable under the control of said detector at the end of a time delay interval of selected duration following application of light on said detector at intensities in excess of a selected triggering level, a control relay, means drivingly connecting the control relay, together with a fluctuating potential power source, in the plate circuit of said thyratron relay, and means operable selectively to connect the time delay and control relays in power supply controlling relation with respect to the power actuated device.

References Cited in the file of this patent

UNITED STATES PATENTS

| | | |
|---|---|---|
| 2,048,269 | Koch | July 21, 1936 |
| 2,402,580 | Roters | June 25, 1946 |
| 2,434,101 | Cann | Jan. 6, 1948 |
| 2,448,736 | Rabinowitz | Sept. 7, 1948 |
| 2,485,119 | Steiner | Oct. 18, 1949 |
| 2,577,774 | Lee | Dec. 11, 1951 |
| 2,764,072 | Walsh | Sept. 25, 1956 |
| 2,774,015 | White | Dec. 11, 1956 |
| 2,776,357 | Porath | Jan. 1, 1957 |
| 2,818,529 | Jaffe et al. | Dec. 31, 1957 |
| 2,898,525 | Jacobs | Aug. 4, 1959 |